United States Patent [19]
Boden et al.

[11] Patent Number: 5,739,257
[45] Date of Patent: Apr. 14, 1998

[54] BINARY PHASE TRANSFER/AMINE CATALYST FOR MAKING AROMATIC POLYCARBONATES

[75] Inventors: Eugene P. Boden, Scotia, N.Y.; Larry I. Flowers, Evansville, Ind.; Peter D. Phelps, Schenectady, N.Y.; David L. Ramsey, Mt. Vernon; Paul D. Sybert, Evansville, both of Ind.

[73] Assignee: General Electric Company, Pittsfield, Mass.

[21] Appl. No.: 734,769

[22] Filed: Oct. 21, 1996

Related U.S. Application Data

[60] Continuation-in-part of Ser. No. 597,417, Feb. 8, 1996, which is a division of Ser. No. 241,324, May 10, 1994, Pat. No. 5,519,105.

[51] Int. Cl.$^6$ ..................................................... C08G 64/00
[52] U.S. Cl. ........................... 528/196; 502/162; 502/164; 502/167; 502/200
[58] Field of Search ................................. 502/162, 164, 502/167, 200; 528/196

[56] References Cited

U.S. PATENT DOCUMENTS

| | | | |
|---|---|---|---|
| 4,471,105 | 9/1984 | Campbell | 528/199 |
| 5,260,418 | 11/1993 | Wulff et al. | 528/502 |
| 5,300,624 | 4/1994 | Boden et al. | 528/199 |

OTHER PUBLICATIONS

Japanese Patent Publication No. 44–22310 Mar. 24, 1969.

*Primary Examiner*—Terressa Mosley

[57] ABSTRACT

A composition and method is provided for making polycarbonate utilizing an effective amount of a binary catalyst system, comprising a phase transfer catalyst selected from the group consisting of methyltributylammonium halide and hexabutylbutylenediammonium halide and a tertiary organic amine, as a condensation catalyst during the interfacial phosgenation of a bisphenol, such as bisphenol A. Improved phosgene utilization and the substantial elimination of emulsion formation in the interfacial polymerization reactor and the processing units downstream thereof results.

9 Claims, No Drawings

BINARY PHASE TRANSFER/AMINE CATALYST FOR MAKING AROMATIC POLYCARBONATES

CROSS REFERENCE TO RELATED APPLICATION

This is a continuation-in-part of copending application Ser. No. 08/597,417 filed on Feb. 8, 1996 which in turn is a division of U.S. application Ser. No. 08/241,324 filed May 10, 1994, now U.S. Pat. No. 5,519,105.

BACKGROUND OF THE INVENTION

1. Field of the Invention

This invention relates to a process for the synthesis of a polycarbonate resin.

2. Brief Description of Related Art

As shown by Freitag et al, The Encyclopedia of Polymer Science and Engineering, John Wiley & Sons, New York (1988), Second Edition, polycarbonate resins have been made by phosgenating bisphenols under interfacial reaction conditions using a tertiary organic amine, such as triethylamine, as a condensation catalyst. Although tertiary organic amines have been found to be effective as bisphenol condensation catalysts, experience has shown that use of tertiary organic amines results in excess phosgene usage. Efforts have been made therefore to develop procedures to minimize excessive phosgene losses. For example, a reactor with an overhead condenser can be used to trap phosgene, as shown by Silva, U.S. Pat. No. 4,701,544, or the rate of heat generated during the course of bisphenol condensation can be monitored, as shown by Brunelle et al, U.S. Pat. No. 4,814,420.

Although tertiary organic amines, have been found to be highly effective as condensation catalysts for building polycarbonate molecular weight during phosgenation, experience has shown that tertiary organic amines often lead to excessive phosgene usage as a result of phosgene hydrolysis, and/or chloroformate hydrolysis prior to the termination of polymerization. For example, in a phosgene hydrolysis rate study, it was found that at a triethylamine concentration of $6.64 \times 10^{-3}$ M, the triethylamine catalyst effected phosgene hydrolysis at a relative rate of greater than 200 compared to a reference value of 1 without any catalyst, With respect to the rate of chloroformate hydrolysis, where a relative value of less that 0.01 has been found for a catalyst-free system, triethylamine shows a value of greater than 100.

The use of phase transfer catalysts (PTC) to promote polycarbonate synthesis in interfacial polymerizations has also been suggested. It has, in fact, been found that the relative rate of phosgene hydrolysis, or chloroformate hydrolysis for the PTC at a molar concentration of $6.64 \times 10^{-3}$, is considerably less than triethylamine. For example, as compared to values greater than 200 and 100 respectively, for triethylamine as a phosgene or chloroformate hydrolysis catalyst at molar concentrations of $6.64 \times 10^{-3}$, a phase transfer catalyst has been found to have relative rate values of 1.7 to 3.5 for phosgene and about 1 for chloroformate. Although tertiary organic amines have been demonstrated to hydrolyze phosgene and chloroformates, the combination of tertiary organic amines and a phase transfer catalyst has given unexpected and surprising results as herein described. By keeping the concentration of the triethylamine catalyst component in a range varying from about 0.1 to about 2.00 mole % based on bis-phenol-A the utilization of phosgene can be made much more efficient, reducing the amount of excess phosgene necessary to insure complete reaction of the bisphenol from about a 15% excess, based on using the tertiary amine alone, to about a 5% excess, sometimes even lower.

Phase transfer catalysts have a tendency to behave as surfactants, emulsifying either the reaction mixture in the interfacial polymerization reactor or the product stream resulting therefrom in the downstream processing units such as separation centrifuges where conditions of high shear mixing are frequently obtained. This tendency to emulsify reaction mixtures or product mixtures in the polymerization process to produce polycarbonates tends to be associated with the slight surface activity of the phase transfer catalyst. The emulsions, when they form, present very large processing difficulties in terms of high viscosities, phase separation, purification, catalyst recovery and the like. Therefor, while the phase transfer catalysts are highly desirable from the standpoint of increasing phosgene utilization, an improper selection of catalytic agents may result in the formation of difficult to process emulsions.

In the process of the present invention, the use of phase transfer catalysts selected from the group consisting of methyltributylammonium halide and hexabutylbutylenediammonium halide results in the substantial elimination of emulsions either in the product stream exiting the interfacial polymerization reactor or in the downstream processing of the product streams resulting from the interfacial polymerization reactor. By substantial elimination, we mean either no emulsion formation or an emulsion that spontaneously separates or resolves into two or more phases within a short period of time ranging from about 2 minutes to about 10 minutes.

The interfacial polymerization of bisphenol and phosgene derivatives to produce polycarbonates is frequently complicated by the formation of emulsions in the interfacial polymerization reactor or in the processing units downstream thereof. Thus separation centrifuges are generally included in the downstream processing to separate organic and aqueous phase in the various washing steps required for product purification; see for example the description given in U.S. Pat. No. 5,260,418 to Wulff et al. The high shear conditions encountered in some of the pumps required for downstream processing or in the downstream centrifuges may lead to the formation of persistent emulsions. The use of low shear mixing, such as obtained with static mixers may help reduce emulsion formation, but will not always completely eliminate it. The formation of persistent emulsion interferes significantly with product recovery and purification. Elimination or reduction of the tendency of the interfacial polymerization product streams to form persistent emulsions in downstream processing units represents a significant process improvement.

Many phase transfer catalysts previously employed in the art have exhibited a tendency to act as surfactants and therefor emulsify either the reaction or product mixtures, either in the interfacial polymerization reactor or in the downstream processing units. Chemically the structure of many of these phase transfer catalysts resembles the chemical structure of some surfactants. While it is desirable that phase transfer catalysts transfer ionic species from phase to phase in a two phase reaction system, the surface activity associated with emulsification under high shear is a drawback.

The phase transfer catalysts used in the process of the present invention, by substantially eliminating the formation of emulsions, demonstrate that the properties of phase transfer catalysts, surfactancy, and emulsification are not inextricably linked in a chemical sense.

SUMMARY OF THE INVENTION

The invention comprises, in the process for the interfacial polymerization of a dihydroxy compound and a carbonate precursor to produce a polycarbonate, in the presence of a catalytic proportion of a phase transfer catalyst, the improvement comprising; selecting a phase transfer catalyst from the group consisting of methyltributylammonium halide and hexabutylbutylenediammonium halide whereby the formation of an emulsion from the aqueous and organic phases of the interfacial polymerization reaction medium, is substantially eliminated.

DETAILED DESCRIPTION OF THE PREFERRED EMBODIMENTS OF THE INVENTION

Aromatic polycarbonate resins may be prepared by reacting a dihydric phenol with a carbonate precursor, such as phosgene, a haloformate or a carbonate ester. Generally speaking, such carbonate polymers may be typified as possessing recurring structural units of the formula:

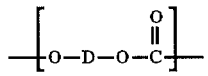

wherein D is a divalent aromatic radical of the dihydric phenol employed in the polymerization reaction. Preferably, the carbonate polymers used to provide the resinous compositions of the invention have an intrinsic viscosity (as measured in methylene chloride at 25° C.) ranging from about 0.30 to about 1.40 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. The preferred polycarbonate resin for use herein is a homopolymer derived from 2,2-bis-(4-hydroxyphenyl) propane and a carbonate precursor.

Included within the term "polycarbonates", for the purposes of this invention are the poly (estercarbonate) resins. These resins may generally be described as polymers comprising recurring carbonate groups,

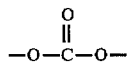

carboxylate, groups,

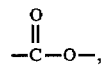

and aromatic carbocyclic groups in the linear polymer chain, in which at least some of the carboxylate groups and at least some of the carbonate groups are bonded directly to ring carbon atoms of the aromatic carbocyclic groups. These poly (ester-carbonate) polymers, in general, are prepared by reacting an aromatic difunctional carboxylic acid or ester forming derivative, a dihydric phenol and a carbonate precursor.

The preparation of poly (ester-carbonates) is described in U.S. Pat. Nos. 3,030,331; 3,169,121; 3,207,814; 4,194,038 and 4,156,069 incorporated herein by reference.

Typical dihydric phenols useful in formulating the polycarbonate resins, as described above, may be represented by the general formula:

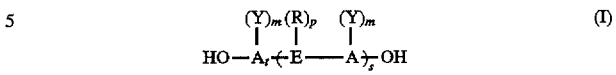

in which A is an aromatic group such as phenylene, biphenylene, naphthylene or anthrylene. E may be an alkylene or alkylidene group such as isopropylidene, butylene, butylidene, isobutylidene, amylene, isoamylene, amylidene, isoamylidene, and generally has from one to twelve carbon atoms, inclusive. Where E is an alkylene or alkylidene group, it may also consist of two or more alkylene or alkylidene groups, connected by a non-alkylene or non-alkylidene group such as an aromatic linkage, a tertiary amino linkage, an ether linkage, a carbonyl linkage, or by a sulfur-containing linkage such as sulfide, sulfoxide and sulfone. In addition, E may be a cycloaliphatic group of five to twelve carbon atoms, inclusive (e.g. cyclopentyl, cyclohexyl), or a cycloalkylidene of five to twelve carbon atoms, inclusive, such as cyclohexylidene; a sulfur-containing linkage, such as sulfide, sulfoxide or sulfone; an ether linkage; a carbonyl group; a direct bond; or a tertiary nitrogen group. Other groups which E may represent will occur to those skilled in the art. R is hydrogen or a monovalent hydrocarbon group such as alkyl of one to eight carbon atoms, inclusive (methyl, ethyl, propyl); aryl (phenyl, naphthyl); aralkyl (benzyl, ethylphenyl); or cycloaliphatic of five to twelve carbon atoms, inclusive, (e.g. cyclo-pentyl, cyclohexyl). Y may be an inorganic atom such as chlorine, bromine, fluorine; an organic group such as the nitro group; an organic group such as R above; or an oxy group such as OR, it being only necessary that Y be inert to and unaffected by the reactants and the reaction conditions. The letter m is any whole number from and including zero through the number of positions on A available for substitution; p is any whole number from and including zero through the number of available positions on E; t is a whole number equal to at least one; and s is any whole number from and including zero to twenty.

In the typical dihydric phenol compound represented by Formula (I) above, when more than one Y substituent is present, they may be the same or different. The same is true for the R substituent. Where s is greater than one, E can be the same or different. Where E is a direct bond, the aromatic rings are directly joined with no intervening alkylene or other bridge. The positions of the hydroxyl groups and Y on the aromatic nuclear residues, A, can be varied in the ortho, meta, or para positions; and the groupings can be in a vicinal, nonsymmetrical or symmetrical relationship, where two or more ring carbon atoms of the aromatic hydrocarbon residue are substituted with Y and a hydroxyl group.

Examples of dihydric phenol compounds that may be employed in the above polymers include:

2,2-bis-(4-hydroxyphenyl)propane (bisphenol-A);
2,4'-dihydroxydiphenylmethane;
bis-(2-hydroxyphenyl)methane;
bis-(4-hydroxyphenyl)methane;
bis-(4-hydroxy-5-nitrophenyl) methane;
bis-(4-hydroxy-2,6-dimethyl-3-methoxyphenyl)methane;
1,1-bis-(4-hydroxyphenyl)ethane;
1,2-bis-(4-hydroxyphenyl)ethane;
1,1-bis-(4-hydroxy-2-chlorophenyl)ethane;
1,1-bis-(2,5-dimethyl-4-hydroxyphenyl)ethane;

1,3-bis-(3-methyl-4-hydroxyphenyl)propane;

2,2-bis-(3-phenyl-4-hydroxyphenyl)propane;

2,2-bis-(3-isopropyl-4-hydroxyphenyl)propane;

2,2-bis-(4-hydroxyphenyl)propane;

2,2-bis-(4-hydroxyphenyl)pentane;

3,3-bis-(4-hydroxyphenyl)pentane;

2,2-bis-(4-hydroxyphenyl)heptane;

bis-(4-hydroxyphenyl)phenylmethane;

bis-(4-hydroxyphenyl)cyclohexymethane;

1,2-bis-(4-hydroxyphenyl)-1,2-bis-(phenyl)propane;

2,2-bis-(4-hydroxyphenyl)-1-phenylpropane; and the like. Also included are dihydroxybenzenes typified by hydroquinone and resorcinol; dihydroxydiphenyls such as 4,4'-dihydroxydiphenyl; 2,2'dihydroxydiphenyl; 2,4'-dihydroxydiphenyl; dihydroxynaphthalenes such as 2,6-dihydroxynaphthalene, etc. Also useful are dihydric phenols wherein E is a sulfur-containing radical such as the dihydroxy aryl sulfones exemplified by:

bis-(4-hydroxyphenyl)sulfone; 2,4'-dihydroxydiphenyl sulfone; bis-(3,5-dimethyl-4- hydroxyphenyl)sulfone; 5'-chloro-2,4'-dihydroxydiphenyl sulfone; 3-chlorobis-(4-hydroxyphenyl)sulfone; and 4,4'dihydroxytriphenyldisulfone; etc. The preparation of these and other useful sulfones are described in U.S. Pat. No. 2,288,282. Hydroxy terminated polysulfones as well as substituted sulfones using halogen, nitrogen, alkyl radicals are also useful.

Dihydroxy aromatic ethers such as those described in U.S. Pat. No. 3,148,172 are useful as the dihydric phenol herein. The dihydroxy aromatic ethers may be prepared as described in U.S. Pat. No. 2,739,171. Illustrative of such compounds are the following:

4,4'-dihydroxydiphenyl ether;

4,4'-dihydroxytriphenyl ether; the 4,3'-,4,2'-, 4,1'-, 2,2'-, 2,3'-dihydroxydiphenyl ethers;

4,4'-dihydroxy-2,6-dimethyldiphenyl ether;

4,4'-dihydroxy-2,5-dimethyldiphenyl ether;

4,4'-dihydroxy-3,3'-diisobutyldiphenyl ether;

4,4'-dihydroxy-3,3'-diisopropyldiphenyl ether;

4,4'-dihydroxy-3,3'-dinitrodiphenyl ether;

4,4'-dihydroxy-3,3'-dichlorodiphenyl ether;

4,4'-dihydroxy-3,3'-difluorodiphenyl ether;

4,4'-dihydroxy-2,3'-dibromodiphenyl ether;

6,6'-dihydroxydinaphthyl-2,2'-ether;

6,6'-dihydroxy-5,5'-dichlorodinaphthyl-2,2'-ether;

4,4'-dihydroxypentaphenyl ether;

4,4'-dihydroxy-2,6-dimethoxydiphenyl ether; and 4,4-dihydroxy-2,5-diethoxydiphenyl ether.

Mixtures of the dihydric phenols can also be employed, and where dihydric phenol is mentioned herein, mixtures of such materials are considered to be included. Other dihydric phenols which are suitable are disclosed in U.S. Pat. Nos. 2,999,835; 3,028,365; 3,334,154; 4,131,575.

The carbonate precursor used to produce the polycarbonate resins may be either a carbonyl halide, a carbonate ester, or a haloformate. The carbonyl halides which can be employed are carbonyl bromides. Typical of the carbonate esters are diphenyl carbonate, di(halophenyl)carbonates such as di(chlorophenyl)carbonate, di(bromophenyl) carbonate, di(trichlorophenyl)carbonate, di(tribromophenyl) carbonate, di(alkylphenyl)carbonate such as di(tolyl) carbonate, phenyltolyl carbonate, chloronaphthyl chlorophenyl carbonate, and the like. The haloformates suitable for use herein include bishaloformates of dihydric phenols such as bischloroformates of hydroquinone or glycols such as bis-haloformates of ethylene glycol, neopentyl glycol, and polyethylene glycol. While other carbonate precursors will occur to those skilled in the art, carbonyl chloride, also know as phosgene, is preferred.

The aromatic difunctional carboxylic acids suitable for producing poly (ester-carbonates) may be represented by the general formula:

$$\text{HOOC—Z—COOH} \qquad \text{(II)}$$

wherein Z represents an aromatic radical such as phenylene, naphthylene, biphenylene, substituted phenylene; two or more aromatic groups connected through non-aromatic linkages such as those defined by E in Formula I; or a divalent aliphatic-aromatic hydrocarbon radical such as an aralkyl or alkaryl radical. For purposes of the present invention, the aromatic dicarboxylic acids or their reactive derivatives such as, for example, the acid halides or diphenyl esters, are preferred. Thus, in the preferred aromatic difunctional carboxylic acids, as represented by Formula II, Z is an aromatic radical such as phenylene, biphenylene, naphthylene, substituted phenylene, etc. Some non-limiting examples of suitable aromatic dicarboxylic acids which may be used in preparing the poly (ester-carbonate) of the instant invention include phthalic acid, isophthalic acid, terephthalic acid, homophthalic acid, o-, m-, and p-phenylenediacetic acid, and the polynuclear aromatic acids such as diphenyl dicarboxylic acids and isomeric naphthalene dicarboxylic acids. The aromatics may be substituted with Y groups in the same manner as the Formula I aromatics are substituted. Of course, these acids may be used individually or as mixtures of two or more different acids.

Aromatic polycarbonates can also be made using the phase transfer catalyst of the present invention include high molecular weight thermoplastic randomly branched materials. Some of the polyfunctional compounds which can be employed in making the branched polymers are generally aromatic and contain at least three functional groups, such as phenoxy, carboxyl, carboxylic anhydride, haloformyl or mixtures there of. Additional polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid and benzophenonetetracarboxylic anhydride. Polyfunctional aromatic compounds useful in making high molecular weight thermoplastic randomly branched polycarbonates are 1,1,1-tris-(4-hydroxyphenyl)-ethane, 4-[4-[1, 1-bis (4-hydroxyphenyl)-ethyl]-dimethylbenzyl] phenol, 1,1,1-tris (4-hydroxyphenyl)ethane, trimellitic anhydride or trimellitic acid or their haloformyl derivatives. In addition, polycarbonate-siloxane block copolymers also can be made by utilizing the phase transfer catalyst of the present invention in the reaction between a bisphenol and a phenolic terminated polydiorgano siloxane, such as a eugenol terminated polydimethylsiloxane.

Although the preparative processes may vary, the preferred processes typically involve dissolving or dispersing the reactants in a suitable water immiscible solvent medium and contacting the reactants with a carbonate precursor, in the presence of a phase transfer catalyst, preferably a tertiary amine co-catalyst and an aqueous caustic solution under controlled pH conditions. Sufficient alkali metal hydroxide base can be utilized to raise and maintain the pH of the mixture. The base is added in sufficient proportion to maintain a pH of the aqueous part of the reaction mixture within the range of from about 10 to about 12, preferably 11 to about 12. The pH of the aqueous phase of the reaction mixture may also be controlled by the gradual addition of caustic such as sodium hydroxide, using an automatic pH controller.

A molecular weight regulator, that is a "chain stopper", may be added to the reactants prior to or during the contacting of them with a carbonate precursor. Useful molecular weight regulators include, but are not limited to, monohydric phenols such as phenol, chroman-I, paratertiarybutylphenol and the like. Techniques for the control of molecular weight are well known in the art and may be used in the present process for controlling the weight average molecular weight of the block copolymer product resins.

The most commonly used water immiscible solvents include methylene chloride, 1,2-dichloroethane, chlorobenzene, toluene and the like.

The preferred process comprises a phosgenation reaction. The temperature at which the phosgenation reaction proceeds may vary from below 0° C., to above 100° C. The reaction preferably proceeds at temperatures of from room temperature (25° C.) to 50° C. Since the reaction is exothermic, the rate of phosgene addition may be used to control the reaction temperature. The amount of the phosgene required will generally depend upon the amount of the dihydric phenol and diol present. Generally speaking, one mole of phosgene will react with one mole of the dihydric phenol and the polysiloxane diol to provide the polymer and two moles of HCl. The foregoing amounts of phosgene are herein referred to as stoichiometric or theoretical amounts. The two moles of HCl are in turn "neutralized" by an acid acceptor. Suitable acid acceptors are either a hydroxide, a carbonate, a bicarbonate, or a phosphate or an alkaline earth metal hydroxide.

The phosgenation reaction may be carried out at sub-atmospheric or super-atmospheric pressures if desired. However, there is generally no great advantage to carrying out the process of the invention under other than ambient reaction vessel pressures occurring at the temperature under which the reaction is conducted.

The phosgenation reactions occurring during the process of the invention are generally completed within a period of from about ten minutes to several hours.

The reaction mixture should be agitated to enhance contact between phases and thereby promote the rate of reaction.

Prior to product resin recovery which can be achieved by standard techniques, such as filtration, decantation and centrifugation, chloroformate end groups are normally substantially eliminated. When a phase transfer catalyst is used without a co-catalyst, the reaction mixture can be agitated for a long period of time until the presence of chloroformates can no longer be detected. Alternatively, the addition of an equivalent level of a phenolic compound, based on the level of chloroformate, can be added at the end of the reaction.

The addition of a greater than stoichiometric amount of phosgene to the reaction mixture leads to formation of chloroformate end groups. These end groups must normally be substantially removed before the polymer is isolated, as mentioned above. The chloroformates can be eliminated by any of the above mentioned methods, the preferred method is by the presence of a tertiary amine co-catalyst in the reaction mixture. The tertiary amine co-catalyst hydrolyses the chloroformates, while the newly formed phenolic end groups react with the residual chloroformates to give a fully built polymer.

The tertiary amine co-catalysts used preferably in the process of the invention may be represented by those having the formula:

$$(R^{14})_3N \qquad (III)$$

where each of the $R^{14}$ are independently selected from the group of $C_2$ to $C_{10}$ alkyl radicals. Preferred tertiary amine catalysts (III) include, but are not limited to, triethylamine, ethylmorpholine and the like.

In accordance with the present invention, the co-catalyst is employed is an effective amount for phase catalysis of the chloroformate end groups.

The amount of tertiary amine co-catalyst used ranges from about 0.01 to 6.00 mole % based on the moles of bisphenol-A present in the reaction medium. A more preferred range is 0.01 to 2.00 mole %, and the most preferred range is 0.20 to 0.70 mole %.

In the present invention a binary catalyst system comprising a selected group of phase transfer catalyst and a tertiary organic amine, the chloroformates react after a few minutes leading to a kinetically improved process. The reaction mixture containing chloroformates is agitated until the presence of chloroformates can not be detected. A detection procedure based on Agree et al can be used employing 4-(4-nitrobenzyl)pyridine (NBP) as shown in Talanta, 1966,13,1151–1160. Spot testing using commercially available phosgene detection paper, such as Chemcasette SP from MDA Scientific of Lincolnshire, Ill., with a portion of the reaction mixture also can be employed.

The phase transfer catalysts function to transfer the water-soluble reactant across the interface into the organic phase where a homogeneous reaction can take place rapidly. Thus, in the reaction involving a water soluble nucleophile, the addition of the phase transfer catalyst causes the transfer of the nucleophile as an ion pair into the organic phase where it reacts with the organic reagent (phosgene). Migration of the cationic catalyst back to the aqueous phase completes the cycle.

The phase transfer catalysts employed in the present invention are well-known in the art as is their preparation.

Phosgenation of the bisphenol can be conducted in a wide variety of either batch or continuous reactors. Such reactors are, for example, stirred tank reactors, which may be either batch or continuous flow. Additional reactors which are included are agitated column and recirculating loop continuous reactors.

The volume ratio of aqueous to organic phase during and at the termination of the phosgenation reaction can be in the range of 0.2–1.1. When the preferred organic liquid is utilized, such as methylene chloride, the reaction may be conducted at reflux which can be 35°–42° C.

Progress of the reaction comprising the process of the invention may be monitored employing conventional analytical techniques.

Those skilled in the art will appreciate that many modifications may be made to the above.

In addition to the phase transfer catalyst, the binary catalyst of the invention comprises a tertiary organic amine such as triethylamine, tributylamine and the like. The proportion of organic amine comprises an amount of a tertiary organic amine ranging from about 0.1 to about 2.0 mole % based on the quantity of bisphenol-A. The two phase transfer catalysts employed are methyltributylammonium halide and hexabutylbutylenediammonium halide.

In the practice of one form of the present invention, a mixture of bisphenol and a phenolic chain-stopper is phosgenated under interfacial reaction conditions in the presence of an organic solvent, in the presence of an effective amount of a phase transfer catalyst selected from the group consisting of methyltributylammonium halide and hexabutylbutylenediammonium halide. Generally the quantity of phase transfer catalyst used ranges from about 0.05 mole % to about 10.00 mole % phase transfer catalyst based on the total moles of bisphenol and phenolic chain stopper present in the reaction medium; such quantity constituting an effective amount. A preferred range for the phase transfer catalyst ranges from about 0.1 to 0.7 mole based on the total moles of bisphenol and phenolic chain stopper. The quantity of tertiary amine co-catalyst ranges from about 0.01 to 6.00 mole % based on the moles of bisphenol-A present in the reaction medium. A more preferred range is 0.01 to 2.00 mole%, and the most preferred range is 0.20 to 0.70 mole %. Suitable organic solvents which can be used are, for example, chlorinated aliphatic hydrocarbons, such as methylene chloride, chloroform, carbon tetrachloride, dichloroethane, trichloroethane, tetrachloroethane, dichloropropane and 1,2 dichloroethylene; substituted aromatic hydrocarbons such as, chlorobenzene, o-dichlorobenzene, and the various chlorotoluenes. The chlorinated aliphatic hydrocarbons, especially methylene chloride, are preferred.

Sufficient alkali metal hydroxide can be utilized to raise the pH of the bisphenol reaction mixture to approximately 10–11.5 prior to phosgenation to provide dissolution of some of the bisphenol and chain-stopper into the aqueous phase.

Aqueous alkali, or alkaline earth metal hydroxide can be used to maintain the pH of the phosgenation mixture which can be in the range of between about 7 to about 12.5 and preferable 10 to 12. Some of the alkali metal or alkaline earth metal hydroxides, which can be employed are for example, sodium hydroxide, potassium hydroxide, and calcium hydroxide. Sodium and potassium hydroxides and particularly sodium hydroxide is preferred. Phosgenation of the bisphenol can be conducted in a wide variety of either batch or continuous reactors. Such reactors are, for example, stirred tank reactors, which may be either batch or continuous flow. Additional reactors which are included are agitated column and recirculating loop continuous reactors.

The volume ratio of aqueous to organic phase during and at the termination of the phosgenation reaction can be in the range of 0.2–1.1. Reaction temperature can be in the range of between about 15°–50° C. When the preferred organic liquid is utilized, such as methylene chloride, the reaction may be conducted at reflux which can be 35°–42° C. The reaction can be conducted at atmospheric pressures, although sub- or superatmospheric pressures may be employed if desired.

During phosgenation, the mixture is agitated, such as, by using a stirrer or other conventional equipment. The phosgenation rate can vary from between about 0.02–0.2 mol of phosgene, pre mol of bisphenol per minute.

Depending upon the molecular weight of polycarbonate desired, phenolic chain-stoppers can be used in a proportion of about 0.5 to 8 mole % based on the total moles of bisphenol and phenolic chain-stopper. Some of the phenolic chain-stoppers are phenol, t-butyl phenol, p-cumyl phenol and the chloroformates of these phenols.

Prior to polycarbonate recovery which can be achieved by standard techniques, such as filtration, decantation, and centrifugation, chloroformate end groups are normally substantially eliminated. When a phase transfer catalyst is used by itself, the reaction mixture must be agitated for a longer period of time Until the presence of chloroformates can no longer be detected. Alternatively, the addition of an equivalent level of a phenolic compound, based on the level of chloroformate, can be added at the end of the reaction.

In the present invention a binary catalyst system comprising a phase transfer catalyst selected from the group consisting of methyltributylammonium halide and hexabutylbutylenediammonium halide and a tertiary organic amine, the chloroformates react after a few minutes leading to a kinetically improved process. The reaction mixture containing chloroformates is agitated until the presence of chloroformates can not be detected. A detection procedure based on Agree et al can be used employing 4-(4-nitrobenzyl) pyridine (NBP) as shown in Talanta, 1966,13,1151–1160.

Spot testing using commercially available phosgene detection paper, such as Chemcasette SP from MDA Scientific of Lincolnshire, Ill., with a portion of the reaction mixture also can be employed.

Upon completion of polymerization, the product polycarbonate resin can be recovered by centrifugation technique, for example as described in U.S. Pat. No. 5,260,418; by electrical treatment as described in Japanese patent publication 44-22310 published Sep. 24, 1969 and/or by decantation and filtration.

The following examples describe the manner and process of making and using the invention and set forth the best mode contemplated by the inventors for carrying out the invention but are not to be construed as limiting. All parts are by weight unless otherwise indicated.

EXAMPLES

Example 1

A 30 liter flask equipped with a stirrer, condenser, pH electrode, NaOH addition port and a phosgene dip tube was charged with 2,268 g of bisphenol-A, 67.55 g of para-cumyl-phenol, 3.4 g sodium gluconate, 16 g of tetrabutylammonium bromide, 3.3 liters water, and 8.1 liters of methylene chloride. Phosgene was introduced at a rate of approximately 40 g/min. A solution of 50 wt. % NaOH was added slowly to maintain a pH of about 10.5 during the phosgene addition. Phosgene addition was terminated when chloroformates were detected by chloroformate test paper (Chemcassette SP from MDA Scientific; Lincoln, Ill.). The reaction was stirred at pH 10.5 and the reaction solution was periodically tested for the presence of chloroformates. After a period of 30 minutes, chloroformates were still detected and 14 ml of triethylamine was added. Upon addition of the triethylamine the chloroformates could no longer be detected by the chloroformate test paper. A sample was removed for molecular weight measurement.

To confirm the completion of polymerization, approximately 5% excess additional phosgene was added to the remaining solution while controlling the pH at about 10.5 with the addition of NaOH. After testing with chloroformate test paper to confirm the absence of chloroformates, the reaction mixture was again sampled for the purposes of a molecular weight measurement of the product polymer. Weight average molecular weights of about 32,000 for each sample indicated that the polymerization was completed during the first phosgenation and consequently the amount of phosgene used can be measured from when chloroformates were first observed. An excess of phosgene of 1.2% over theoretical was required.

Concentrated aqueous HCl was added until the pH was lowered to about 1.0. The aqueous phase was removed and the organic phase was washed several times with water using a liquid-liquid centrifuge. To judge the propensity of the various catalysts to emulsify under high shear conditions, the exit on the water discharge was closed forcing both the water wash and the polymer phase through the heavy phase centripetal pump in the centrifuge. During this time a sample was obtained of the mixture at the heavy phase discharge. The stability of the emulsion was determined by the length of time required for the phases to separate. Comparative results are summarized in a following table.

Example 2

The experiment of Example 1 was repeated using methyltributylammonium chloride as the phase transfer catalyst in place of tetrabutylammonium bromide. As in Example 1, phosgenation was terminated when chloroformates were first detected and the chloroformates were present for 30 minutes when triethylamine was then added to complete the reaction. Molecular weight measurement after the chloroformates disappeared and after a 5% rephosgenation showed the same molecular weight indicating completion of the polymerization with 2% excess phosgene required. Comparative results are summarized in a following table.

Example 3

The experimental apparatus used in Example 1 was charged with 2,268 g bisphenol-A, 67.55 g para-cumylphenol, 3.4 g sodium gluconate, 3.3 liters of water, 8.1 liters of methylene chloride, and 14 ml of triethylamine. Phosgene was introduced at a rate of approximately 40 g/min. A solution of 50 wt. % NaOH was added slowly to maintain a pH of 10.5 during phosgene addition. Samples for molecular weight determinations were taken between 90% phosgene utilization and about 15% excess phosgene utilization. Molecular weight reached a maximum at approximately 13% excess phosgene and did not change with further addition of phosgene. No chloroformates were detected during the reaction. The experiment was twice repeated and both times showed a molecular weight maximum at 7% excess phosgene. Comparative results are summarized in a following table.

Example 4

The experimental apparatus used in Example 1 was charged with 2,268 g bisphenol-A, 67.55 g para-cumylphenol, 3.4 g sodium gluconate, 3.3 liters of water, and 8.1 liters of methylene chloride. To this mixture was added 12.5 g methyltributylammonium chloride and 3.5 ml of triethylamine. Phosgene was introduced at a rate of approximately 40 g/min. A solution of 50 wt % NaOH was added slowly to maintain a pH of about 10.5 during the phosgene addition.

As in Example 1, phosgene addition was terminated when chloroformates were detected by chloroformate test paper. The chloroformates were no longer detectable after a period of about 5 minutes. To confirm the completion of polymerization, approximately 5% additional phosgene was added to the remaining solution while the pH was maintained at 10.5 by means of the further addition of NaOH. After confirming the absence of chloroformates, the reaction mixture was sampled for a molecular weight measurement. Weight average molecular weights of about 32,000 for each sample indicated that the polymerization was completed during the first phosgenation. Comparative results are summarized in a following table.

Example 5

The experiment of Example 4 was repeated substituting 14.59 g of hexabutylbutylenediammonium bromide for methyltributylammmonium chloride. 3.5 ml of triethylamine was used as a co-catalyst. Comparative results are summarized in a following table.

Example 6

The experiment of Example 4 supra., was repeated substituting 16.81 g of hexabutylhexylenediammonium bromide for methyltributylammmonium chloride. 3.5 ml of triethylamine was used as a co-catalyst. Comparative results are summarized in a following table.

TABLE 1

Summary of Experimental Results

| Example | Phase Transfer Catalyst (PTC) | Amount PTC (g) | Amount of Triethylamine (ml) | Excess Phosgene Required % | Time for Emulsion To Split [a] |
|---|---|---|---|---|---|
| 1 | TBAB | 16.00 | 0 | 1.2 | >24 hrs. |
| 2 | MTBA | 12.50 | 0 | 2.0 | not tested |
| 3a | none | 0 | 14 | 13.0 | not tested |
| 3b | none | 0 | 14 | 7.0 | not tested |
| 3c | none | 0 | 14 | 7.0 | not tested |
| 4 | MTBA | 12.50 | 3.5 | 2.0 | <4 min. |
| 5 | C4B | 14.59 | 3.5 | 3.3 | 4–5 min. |
| 6 | C6B | 16.81 | 3.5 | 4.8 | >1 hr. |

Notes:
TBAB = tetrabutylammonium bromide
MTBA = methyltributylammonium chloride
C4B = hexabutylbutylenediammonium bromide
C6B = hexabutylhexylenediammonium bromide
[a] To judge the propensity of the various catalysts to emulsify, the exit on the water discharge was closed forcing both the water wash and the polymer phase through the heavy phase centripetal pump in the centrifuge. During this time a sample was obtained of the mixture at the heavy phase discharge. The stability of the emulsion was determined by the length of time required for the phases to separate.

Examples Showing Emulsification Resolution Times

Summary of Experimental Results

Examples 1 and 2 demonstrate that a phosgene utilization close to theoretical can be achieved using a phase transfer catalyst. This catalyst system has the disadvantage of suffering from persistent chloroformates at completion of the reaction. The presence of chloroformates requires the addition of triethylamine, hisphenol-A, or some other phenolic compound for timely elimination of chloroformates from the reaction mixture. Example 3 demonstrates poor phosgene utilization when using triethylamine as the sole catalyst. Examples 4, 5, and 6 show the advantage of using the binary catalyst of the invention, a phase transfer catalyst and triethylamine, to achieve improved phosgene utilization with timely chloroformate decomposition.

Examples 4 and 5 show that low phosgene usage, timely chloroformate decomposition, and a low propensity to emulsify can be achieved using the appropriate PCT and a tertiary amine, such as, triethyl amine.

What is claimed is:

1. A process for the interfacial polymerization of a dihydroxy compound and a phosgene to produce a polycarbonate, in the presence of a catalytic proportion of a phase transfer catalyst, the improvement comprising; selecting a phase transfer catalyst from the group consisting of methyltributylammonium halide and hexabutylbutylenediammonium halide whereby the formation of an emulsion of the aqueous and organic phases is substantially eliminated.

2. The process of claim 1 wherein the phase transfer catalyst is a methyltributylammonium halide.

3. The process of claim 1 wherein the phase transfer catalyst is a hexabutylbutylenediammonium halide.

4. The process of claim 1 wherein said halide is a chloride.

5. The process of claim 1 wherein said halide is a bromide.

6. The process of claim 1 wherein the phase transfer catalyst is a methyltributylammonium halide.

7. The process of claim 1 wherein the phase transfer catalyst is a hexabutylbutylenediammonium halide.

8. The process of claim 1 carried out in the presence of a tertiary amine co-catalyst, employed in a catalytic proportion.

9. The process of claim 8 wherein the co-catalyst is triethylamine.

* * * * *